Jan. 29, 1952
D. BARTOLETTI
2,583,624
ANTISKID CHAIN FOR AUTOMOBILES
Filed July 30, 1948
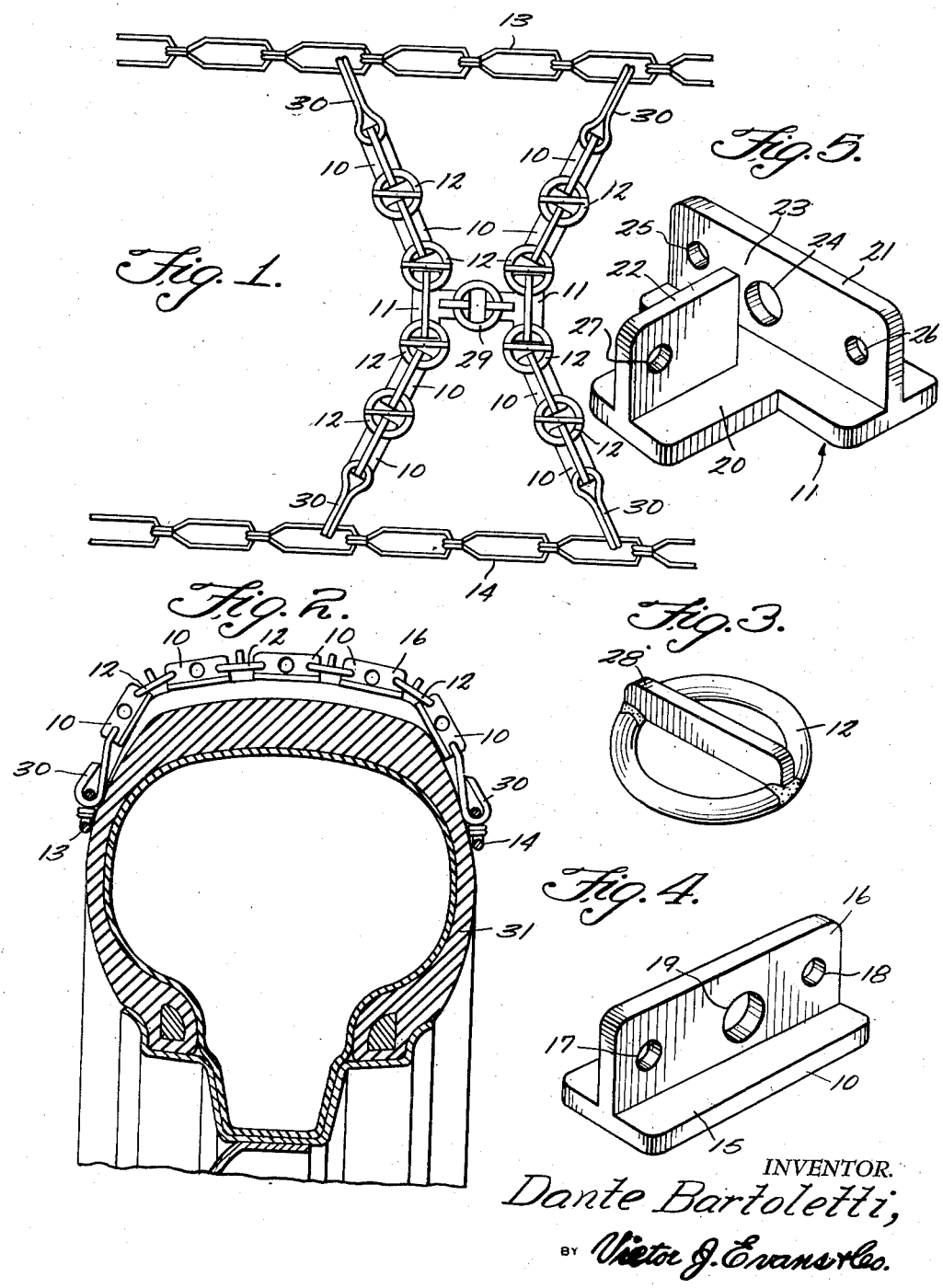
INVENTOR.
Dante Bartoletti,
BY Victor J. Evans & Co.
ATTORNEYS Patented Jan. 29, 1952

2,583,624

UNITED STATES PATENT OFFICE 2,583,624

ANTISKID CHAIN FOR AUTOMOBILES

Dante Bartoletti, Burgettstown, Pa., assignor of one-half to Charles W. Cunningham, Burgettstown, Pa.

Application July 30, 1948, Serial No. 41,537

1 Claim. (Cl. 152—243)

This invention relates to non-skid chains for tires of motor vehicle wheels where chains at the sides of the tire are tied together by cross chains, and in particular the invention relates to an improved method of forming the cross chains wherein bars, T-shape in cross section, are connected through the webs by rings with cross-bars across the rings.

The purpose of this invention is to improve traction and wearing characteristics of non-skid tire chains by providing links with webs positioned perpendicular to the face of the tire and means for holding the webs in outwardly extending positions.

Various attachments have been used in combination with non-skid chains for motor vehicles to facilitate gripping and prevent skidding but devices that are particularly efficient in holding in snow and ice are not adapted for use on hard surfaced roads and for this reason a large percentage of devices now in use are formed of round link chains. With this thought in mind this invention contemplates a special T-shaped link for the cross chains of non-skid tire chains with the links connected by rings through upstanding webs wherein the edge of the web is used as the gripping element and the flat head distributes the load over the surface of the tire.

The object of this invention, is therefore, to improve the design and construction of links for cross chains of non-skid chains of motor vehicle tires.

Another object of the invention is to provide a load bearing link for non-skid chains in which the load is distributed over the tire on which the chain is used.

Another object of the invention is to provide means for mounting T-shaped links in non-skid tire chains wherein the edge of the web is maintained in an outwardly extending position so that the edge provides the effective element of the chain.

A further object of the invention is to provide an improved non-skid chain for tires of motor vehicles having T-shaped links held by rings which is of a simple and economical construction.

With these and other objects and advantages in view the invention consists of the new and useful combination, construction, and arrangement of parts as hereinafter more fully described, set forth in the claim appended hereto and disclosed in the accompanying drawings, forming part hereof, wherein:

Figure 1 is a plan view of a section of the improved non-skid tire chain showing a cross chain and with parts broken away.

Figure 2 is a typical cross section through a tire and rim of a wheel showing the non-skid chain thereon.

Figure 3 is a detail showing one of the connecting rings.

Figure 4 is a detail showing a straight link which is T-shaped in cross section.

Figure 5 is also a detail showing a center connecting link which is T-shaped in plan and also T-shaped in cross section.

Referring now to the drawings wherein like reference characters denote corresponding parts, the non-skid chain of this invention includes a straight link 10, a T-shaped link 11, rings 12, and side chains 13 and 14.

The link 10 is formed with a flat base 15 having a centrally disposed longitudinally extending web 16 with openings 17 and 18 adjacent the ends of the web, and with a relatively large opening 19 at the center.

The link 11 is formed with a T-shaped base 20 having an upwardly extending web 21 on the head and a short web 22 on the leg which provides a space 23 between the end thereof and the web 21. The web 21 is provided with a large opening 24 at the center and ring receiving openings 25 and 26 adjacent the ends, and the web 22 is provided with one ring receiving opening 27 adjacent the outer end.

The ends of the links are connected by the rings 12 which have cross bars 28 integral therewith, and the links at the center may be connected by plain rings 29, as shown in Figure 1.

It will be understood that the rings may be used with or without the cross bars, and the ends of the links may be connected to the side chains 13 and 14 by connecting links 30, or by any suitable means.

With the parts arranged in this manner side slip is reduced to a minimum and greater traction is provided on both a forward and reverse pull. By using the round connecting rings the T-shaped links are free to move vertically and horizontally without binding, and the cross bars of the rings provide positive protection against side slipping.

In use the chain is assembled on a tire 31 as shown in Figure 2, and as many cross chains, or as many connections between the cross chains, may be used as may be desired.

The large openings 19 and 24 and also the space 23 reduce the weight of the cross chains, and also prevent clogging and provide a self cleaning chain.

What is claimed is:

A non-skid tire chain comprising side chains positioned around the opposite sides of a tire, straight links having flat bases with longitudinally positioned centrally disposed outwardly extended webs thereon positioned between the side chains, circular links having outwardly extended cross bars thereon extended through the webs of the straight links connecting the said straight links to provide cross chains with the flat bases of the straight links positioned against the surface of a tire, T-shaped links positioned in said cross chains having flat bases with upwardly extended webs connected by circular links through the webs thereof to the webs of adjoining straight links and also to a corresponding T-shaped link in an adjoining chain, and connecting links connecting the webs of the straight links at the ends of the cross chains to the said side chains.

DANTE BARTOLETTI.

REFERENCES CITED

The following references are of record in the file of this patent:

UNITED STATES PATENTS

| Number | Name | Date |
| --- | --- | --- |
| 1,445,810 | Weichmann | Feb. 20, 1923 |
| 1,581,722 | DelValle | Apr. 20, 1926 |
| 1,684,632 | La Plant | Sept. 18, 1928 |
| 1,763,998 | Allmon | June 17, 1930 |
| 1,834,487 | German | Dec. 1, 1931 |
| 2,450,691 | Russell | Oct. 5, 1948 |